(12) United States Patent
Hiramoto et al.

(10) Patent No.: US 9,544,570 B2
(45) Date of Patent: Jan. 10, 2017

(54) THREE-DIMENSIONAL IMAGE PICKUP APPARATUS, LIGHT-TRANSPARENT UNIT, IMAGE PROCESSING APPARATUS, AND PROGRAM

(75) Inventors: Masao Hiramoto, Osaka (JP); Yasunori Ishii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 460 days.

(21) Appl. No.: 13/807,059

(22) PCT Filed: Apr. 11, 2012

(86) PCT No.: PCT/JP2012/002517
§ 371 (c)(1),
(2), (4) Date: Dec. 27, 2012

(87) PCT Pub. No.: WO2012/144162
PCT Pub. Date: Oct. 26, 2012

(65) Prior Publication Data
US 2013/0107009 A1    May 2, 2013

(30) Foreign Application Priority Data

Apr. 22, 2011    (JP) .................................. 2011-096333

(51) Int. Cl.
*H04N 13/02*    (2006.01)
*G01C 11/30*    (2006.01)
*G03B 35/10*    (2006.01)

(52) U.S. Cl.
CPC .......... *H04N 13/0203* (2013.01); *G01C 11/30* (2013.01); *H04N 13/0214* (2013.01); *H04N 13/0271* (2013.01); *G03B 35/10* (2013.01)

(58) Field of Classification Search
CPC ..... G01C 11/30; G03B 35/10; H04N 13/0203; H04N 13/0214; H04N 13/0271
(Continued)

(56) References Cited

U.S. PATENT DOCUMENTS 6,603,876 B1 *  8/2003  Matsuo ................. G03B 35/10
                                                                  348/49
6,807,295 B1   10/2004  Ono
(Continued)

FOREIGN PATENT DOCUMENTS

CN    1243263 A    2/2000
CN    1502056 A    6/2004
(Continued)

OTHER PUBLICATIONS

International Search Report for corresponding International Application No. PCT/JP2012/002517 mailed May 22, 2012.
(Continued)

*Primary Examiner* — Christopher S Kelley
*Assistant Examiner* — Deirdre Beasley
(74) *Attorney, Agent, or Firm* — Renner, Otto, Boisselle & Sklar, LLP

(57) ABSTRACT

A 3D image capture device according to an embodiment includes: a light transmitting section 1 with a transmitting area 1a, of which the spectral transmittance characteristic varies in a first direction; an image sensor 2a which is arranged to receive light that has been transmitted through the light transmitting section 1 and which outputs a photoelectrically converted signal representing the light received; and an image processing section which extracts an edge of a subject in the first direction, which is included in an image that has been generated based on the photoelectrically converted signal supplied from the image sensor 2a, and which estimates information about the depth of the subject based on a lightness or hue pattern of a background in the vicinity of the edge extracted.

13 Claims, 10 Drawing Sheets

(58) Field of Classification Search
USPC .......................................................... 348/46
See application file for complete search history.

(56) References Cited

U.S. PATENT DOCUMENTS

| | | | |
|---|---|---|---|
| 9,153,032 B2* | 10/2015 | Jung | |
| 2002/0171740 A1 | 11/2002 | Seo | |
| 2004/0165062 A1* | 8/2004 | Kang | H04N 5/2254 348/46 |
| 2005/0002559 A1* | 1/2005 | Terauchi | G06T 7/0075 382/154 |
| 2006/0232666 A1* | 10/2006 | Op De Beeck | G06T 7/0067 348/51 |
| 2008/0174849 A1 | 7/2008 | Asao | |
| 2008/0260288 A1* | 10/2008 | Redert | G06T 7/0051 382/285 |
| 2009/0041449 A1* | 2/2009 | Kim | G03B 35/26 396/324 |
| 2009/0103782 A1* | 4/2009 | Sim | G06T 7/0051 382/106 |
| 2009/0284627 A1* | 11/2009 | Bando | G06K 9/00201 348/273 |
| 2010/0066854 A1 | 3/2010 | Mather et al. | |
| 2010/0182410 A1* | 7/2010 | Verburgh | G06T 7/0071 348/51 |
| 2011/0134109 A1* | 6/2011 | Izumi | G06T 15/205 345/419 |
| 2011/0135194 A1* | 6/2011 | Izumi | G06T 7/0051 382/164 |
| 2011/0234756 A1* | 9/2011 | Adler | G06T 5/002 348/46 |
| 2011/0249886 A1* | 10/2011 | Park | H04N 13/026 382/154 |
| 2012/0002862 A1* | 1/2012 | Mita | G06K 9/00697 382/154 |
| 2012/0105598 A1 | 5/2012 | Hiramoto et al. | |
| 2012/0133743 A1 | 5/2012 | Hiramoto et al. | |
| 2013/0060146 A1* | 3/2013 | Yang | G01B 11/245 600/476 |
| 2013/0317861 A1* | 11/2013 | Tofte | G06Q 10/06 705/4 |
| 2014/0049535 A1* | 2/2014 | Wang | G01B 11/2509 345/419 |
| 2014/0169701 A1* | 6/2014 | Cui | G06T 3/4053 382/299 |
| 2015/0029312 A1* | 1/2015 | Paik | H04N 5/2254 348/46 |

FOREIGN PATENT DOCUMENTS

| | | |
|---|---|---|
| CN | 1830217 A | 9/2006 |
| JP | 62-217790 A | 9/1987 |
| JP | 62-291292 A | 12/1987 |
| JP | 02-171737 A | 7/1990 |
| JP | 02-171740 A | 7/1990 |
| JP | 11-98418 A | 4/1999 |
| JP | 2001-016611 A | 1/2001 |
| JP | 2001-074432 | 3/2001 |
| JP | 2002-344999 A | 11/2002 |
| JP | 2003-134533 A | 5/2003 |
| JP | 2008-152244 A | 7/2008 |
| JP | 2009-276294 A | 11/2009 |
| JP | 2010-038788 A | 2/2010 |
| JP | 2010-079298 A | 4/2010 |
| WO | 2011/142062 A1 | 11/2011 |
| WO | 2011/151948 A1 | 12/2011 |

OTHER PUBLICATIONS

Form PCT/ISA/237 and partial English translation for corresponding International Application No. PCT/JP2012/002517 dated May 22, 2012.

Yuta Moriue et al., "A Real-time Monocular Stereo System Using a Viewpoint Switching Iris", Transactions of the 27$^{th}$ Annual Conference of the Robotics Society of Japan, 3R2-06, 2009 and concise explanation.

Chinese Search Report and English translation thereof for corresponding Chinese Application No. 201280001375.9 dated May 7, 2015.

* cited by examiner (a) SIGNAL LEVEL $\Sigma Tr$ ; $\Sigma Tr = (1/2)\sin X + (1/2)X$ ; HORIZONTAL DISTANCE x (b) SIGNAL LEVEL $\Sigma Tr - (1/2)X$ ; $\Sigma Tr = (1/2)\sin X$ ; HORIZONTAL DISTANCE x

THREE-DIMENSIONAL IMAGE PICKUP APPARATUS, LIGHT-TRANSPARENT UNIT, IMAGE PROCESSING APPARATUS, AND PROGRAM

TECHNICAL FIELD

The present invention relates to a single-lens 3D image capturing technology for generating a parallax image using a single optical system and a single image sensor.

BACKGROUND ART

Recently, the performance and functionality of digital cameras and digital movie cameras that use some solid-state image sensor such as a CCD and a CMOS (which will be sometimes simply referred to herein as an "image sensor") have been enhanced to an astonishing degree. In particular, the size of a pixel structure for use in a solid-state image sensor has been further reduced these days thanks to rapid development of semiconductor device processing technologies, thus getting an even greater number of pixels and drivers integrated together in a solid-state image sensor. As a result, the resolution of an image sensor has lately increased rapidly from around one million pixels to ten million or more pixels in a matter of few years. On top of that, the quality of an image captured has also been improved significantly as well. As for display devices, on the other hand, LCD and plasma displays with a reduced depth now provide high-resolution and high-contrast images, thus realizing high performance without taking up too much space. And such video quality improvement trends are now spreading from 2D images to 3D images. In fact, 3D display devices that achieve high image quality although they require the viewer to wear a pair of polarization glasses have been developed just recently.

As for the 3D image capturing technology, a typical 3D image capture device with a simple arrangement uses an image capturing system with two cameras to capture a right-eye image and a left-eye image. According to the so-called "two-lens image capturing" technique, however, two cameras need to be used, thus increasing not only the overall size of the image capture device but also the manufacturing cost as well. To overcome such a problem, methods for capturing multiple images with parallax (which will be sometimes referred to herein as a "multi-viewpoint image") by using a single camera have been researched and developed. Such a method is called a "single-lens image capturing method".

For example, Patent Document No. 1 discloses a scheme that uses two polarizers, of which the transmission axes cross each other at right angles, and a rotating polarization filter. FIG. 14 is a schematic representation illustrating an arrangement for an image capturing system that adopts such a scheme. This image capturing system includes a 0-degree-polarization polarizer 11, a 90-degree-polarization polarizer 12, a reflective mirror 13, a half mirror 14, a circular polarization filter 15, a driver 16 that rotates the circular polarization filter 15, an optical lens 3, and an image capture device 9 for capturing the image that has been produced by the optical lens. In this arrangement, the half mirror 14 reflects the light that has been transmitted through the polarizer 11 and then reflected from the reflective mirror 13 but transmits the light that has been transmitted through the polarizer 12. With such an arrangement, the light beams that have been transmitted through the two polarizers 11 and 12, which are arranged at two different positions, pass through the half mirror 14, the circular polarization filter 15 and the optical lens 3 and then enter the image capture device 9, where an image is captured. The image capturing principle of this scheme is that two images with parallax are captured by rotating the circular polarization filter 15 so that the light beams that have been incident on the two polarizers 11 and 12 are imaged at mutually different times.

According to such a scheme, however, images at mutually different positions are captured time-sequentially by rotating the circular polarization filter 15, and therefore, two images with parallax cannot be captured at the same time, which is a problem. In addition, the durability of such a system is also a question mark because the system uses mechanical driving. On top of that, since the incoming light passes through the polarizers 11, 12 and the polarization filter 15, the quantity of the light received eventually by the image capture device 9 decreases by as much as 50%, which is non-negligible, either.

To overcome these problems, Patent Document No. 2 discloses a scheme for capturing two images with parallax at the same time without using such mechanical driving. An image capture device that adopts such a scheme gets the two incoming light beams, which have come from two different directions, condensed by a reflective mirror, and then received by an image sensor in which two different kinds of polarization filters are arranged alternately, thereby capturing two images with parallax without using a mechanical driving section.

FIG. 15 is a schematic representation illustrating an arrangement for an image capturing system that adopts such a scheme. This image capturing system includes two polarizers 11 and 12, of which the transmission axes are arranged to cross each other at right angles, reflective mirrors 13, an optical lens 3, and an image sensor 2. On its image capturing plane, the image sensor 2 has a number of pixels 10 and polarization filters 17 and 18, each of which is provided one to one for an associated one of the pixels 10. Those polarization filters 17 and 18 are arranged alternately over all of those pixels. In this case, the transmission axis directions of the polarization filters 17 and 18 agree with those of the polarizers 11 and 12, respectively.

With such an arrangement, the incoming light beams are transmitted through the polarizers 11 and 12, reflected from the reflective mirrors 13, passed through the optical lens 3 and then incident on the image capturing plane of the image sensor 1. Those light beams to be transmitted through the polarizers 11 and 12, respectively, and then incident on the image sensor 1 are transmitted through the polarization filters 17 and 18 and then photoelectrically converted by the pixels that are located right under those polarization filters 17 and 18. If the images to be produced by those light beams that have been transmitted through the polarizers 11 and 12 and then incident on the image sensor 1 are called a "right-eye image" and a "left-eye image", respectively, then the right-eye image and the left-eye images are generated by a group of pixels that face the polarization filters 17 and a group of pixels that face the polarization filter 18, respectively.

As can be seen, according to the scheme disclosed in Patent Document No. 2, two kinds of polarization filters, of which the transmission axes are arranged so as to cross each other at right angles, are arranged alternately over the pixels of the image sensor, instead of using the circular polarization filter disclosed in Patent Document No. 1. As a result, although the resolution decreases to a half compared to the method of Patent Document No. 1, a right-eye image and a left-eye image with parallax can be obtained at the same time by using a single image sensor. According to such a technique, however, the incoming light has its quantity decreased considerably when being transmitted through the polarizers and the polarization filters, and therefore, the quantity of the light received by the image sensor decreases as significantly as in Patent Document No. 1.

To cope with such a problem of the decreased quantity of light received, Patent Document No. 3 discloses a technique for obtaining two images with parallax and a normal image with a single image sensor. According to such a technique, those two images with parallax and the normal image can be obtained by a single image sensor by changing mechanically some components that have been used to capture two images with parallax with alternative components for use to capture a normal image, and vice versa. When two images with parallax are going to be obtained, two polarization filters are arranged on the optical path as disclosed in Patent Document No. 2. On the other hand, when a normal image is going to be obtained, those polarization filters are mechanically removed from the optical path. By introducing such a mechanism, those images with parallax and a normal image that uses the incoming light highly efficiently can be obtained.

Although a polarizer or a polarization filter is used according to the techniques disclosed in Patent Document Nos. 1 to 3, color filters may also be used according to another approach. For example, Patent Document No. 4 discloses a technique for obtaining two images with parallax at the same time using color filters. FIG. 16 schematically illustrates an image capturing system that adopts such technique. The image capturing system that uses that technique includes a lens 3, a lens diaphragm 19, a light beam confining plate 20 with two color filters 20a and 20b that have mutually different transmission wavelength ranges, and a photosensitive film 21. In this case, the color filters 20a and 20b may be filters that transmit red- and blue-based light rays, respectively.

In such an arrangement, the incoming light passes through the lens 3, the lens diaphragm 19 and the light beam confining plate 20 and produces an image on the photosensitive film. In the meantime, only red- and blue-based light rays are respectively transmitted through the two color filters 20a and 20b of the light beam confining plate 20. As a result, a magenta-based color image is produced on the photosensitive film by the light rays that have been transmitted through the two color filters. In this case, since the color filters 20a and 20b are arranged at mutually different positions, the image produced on the photosensitive film comes to have parallax. Thus, if a photograph is developed with the photosensitive film and viewed with a pair of glasses, in which red and blue films are attached to its right- and left-eye lenses, the viewer can view an image with depth. In this manner, according to the technique disclosed in Patent Document No. 4, a multi-viewpoint image can be produced using the two color filters.

According to the technique disclosed in Patent Document No. 4, the light rays are imaged on the photosensitive film, thereby producing images with parallax there. Meanwhile, Patent Document No. 5 discloses a technique for producing images with parallax by transforming incoming light into electrical signals. FIG. 17 schematically illustrates a light beam confining plate according to Patent Document No. 5. According to such a technique, a light beam confining plate 22, which has a red ray transmitting R area 22R, a green ray transmitting G area 22G and a blue ray transmitting B area 22B, is arranged on a plane that intersects with the optical axis of the imaging optical system at right angles. And by getting the light rays that have been transmitted through those areas received by a color image sensor that has red-, green- and blue-ray-receiving R, G and B pixels, an image is generated based on the light rays that have been transmitted through those areas.

Patent Document No. 6 also discloses a technique for obtaining images with parallax using a similar configuration to the one used in Patent Document No. 5. FIG. 18 schematically illustrates a light beam confining plate as disclosed in Patent Document No. 6. According to that technique, by making the incoming light pass through R, G and B areas 23R, 23G and 23B of the light beam confining plate 23, images with parallax can also be produced.

Patent Document No. 7 also discloses a technique for generating multiple images with parallax using a pair of filters with mutually different colors, which are arranged symmetrically to each other with respect to an optical axis. By using red and blue filters as the pair of filters, an R pixel that senses a red ray observes the light that has been transmitted through the red filter, while a B pixel that senses a blue ray observes the light that has been transmitted through the blue filter. Since the red and blue filters are arranged at two different positions, the light received by the R pixel and the light received by the B pixel have come from mutually different directions. Consequently, the image observed by the R pixel and the image observed by the B pixel are ones viewed from two different viewpoints. And by defining corresponding points between those images on a pixel-by-pixel basis, the magnitude of parallax can be calculated. And based on the magnitude of parallax calculated and information about the focal length of the camera, the distance from the camera to the subject can be obtained.

Patent Document No. 8 discloses a technique for obtaining information about a subject distance based on two images that have been generated using either a diaphragm to which two color filters with mutually different aperture sizes (e.g., red and blue color filters) are attached or a diaphragm to which two color filters in two different colors are attached horizontally symmetrically with respect to the optical axis. According to such a technique, if light rays that have been transmitted through the red and blue color filters with mutually different aperture sizes are observed, the degrees of blur observed vary from one color to another. That is why the degrees of blur of the two images that are associated with the red and blue color filters vary according to the subject distance. By defining corresponding points with respect to those images and comparing their degrees of blur to each other, information about the distance from the camera to the subject can be obtained. On the other hand, if light rays that have been transmitted through two color filters in two different colors that are attached horizontally symmetrically with respect to the optical axis are observed, the direction from which the light observed has come changes from one color to another. As a result, two images that are associated with the red and blue color filters become images with parallax. And by defining corresponding points with respect to those images and calculating the distance between those corresponding points, information about the distance from the camera to the subject can be obtained.

According to the techniques disclosed in Patent Documents Nos. 4 to 8 mentioned above, images with parallax can be produced by arranging RGB color filters on a light beam confining plate. However, since a light beam confining plate is used, the percentage of the incoming light that can be used decreases significantly. In addition, to increase the effect of parallax, those RGB color filters should be arranged at distant positions and should have decreased areas. In that case, however, the percentage of the incoming light that can be used further decreases.

Unlike these techniques, Patent Document No. 9 discloses a technique for obtaining multiple images with parallax and a normal image that is free from the light quantity problem by using a diaphragm in which RGB color filters are arranged. According to that technique, when the diaphragm is closed, only the light rays that have been transmitted through the RGB color filters are received. On the other hand, when the diaphragm is opened, the RGB color filter areas are outside of the optical path, and therefore, the incoming light can be received entirely. Consequently, images with parallax can be obtained when the diaphragm is closed and a normal image that uses the incoming light highly efficiently can be obtained when the diaphragm is opened.

CITATION LIST

Patent Literature

Patent Document No. 1: Japanese Laid-Open Patent Publication No. 62-291292
Patent Document No. 2: Japanese Laid-Open Patent Publication No. 62-217790
Patent Document No. 3: Japanese Laid-Open Patent Publication No. 2001-016611
Patent Document No. 4: Japanese Laid-Open Patent Publication No. 2-171737
Patent Document No. 5: Japanese Laid-Open Patent Publication No. 2002-344999
Patent Document No. 6: Japanese Laid-Open Patent Publication No. 2009-276294
Patent Document No. 7: Japanese Laid-Open Patent Publication No. 2010-38788
Patent Document No. 8: Japanese Laid-Open Patent Publication No. 2010-79298
Patent Document No. 9: Japanese Laid-Open Patent Publication No. 2003-134533

Non-Patent Literature

Non-Patent Document No. 1: Yuta MORIUE, Takeshi TAKAKI, and Idaku ISHII, A Real-time Monocular Stereo System Using a Viewpoint Switching Iris, Transactions of the 27$^{th}$ Annual Conference of the Robotics Society of Japan, 3R2-06, 2009.

SUMMARY OF INVENTION

Technical Problem

According to any of these techniques of the related art, a multi-viewpoint image can be certainly generated, but the quantity of the light received by the image sensor is smaller than usual because a polarizer or color filters are used. In order to receive a sufficient quantity of incoming light, some mechanism that removes the polarizing portion or color filter areas from the optical path needs to be used. That is to say, according to none of these techniques of the related art, a multi-viewpoint image and an image that uses the incoming light highly efficiently can be obtained at the same time without using such a mechanism.

Also, according to the related art, in estimating depth information based on the multi-viewpoint image obtained, feature portions are extracted from the multiple images and matched to each other, thereby estimating the depth information. Alternatively, as disclosed in Patent Document No. 6, the depth information can also be estimated by calculating a pixel shift based on a linear color model in an RGB color space.

An embodiment of the present invention provides an image capturing technique by which both an image that uses incoming light highly efficiently and depth information can be obtained at the same time without using the known depth information estimating method.

Solution to Problem

In order to overcome the problem described above, a 3D image capture device as an embodiment of the present invention includes: a light transmitting section with a transmitting area, of which the spectral transmittance characteristic varies in a first direction; an image sensor which is arranged to receive light that has been transmitted through the light transmitting section and which outputs a photoelectrically converted signal representing the light received; an imaging section which produces an image on the image capturing plane of the image sensor; and an image processing section which extracts an edge of a subject in the first direction, which is included in an image that has been generated based on the photoelectrically converted signal supplied from the image sensor, and which estimates information about the depth of the subject based on a lightness or hue pattern of a background in the vicinity of the edge extracted.

This general and particular aspect of the present invention can be generally implemented as a system, a method, a computer program or a combination thereof.

Advantageous Effects of Invention

A 3D image capture device as an embodiment of the present invention can transform information about the depth of a subject into information about the brightness or color of an image, and therefore, can calculate depth information. Also, in one embodiment, by increasing the transmittance of the rest of the light transmitting section other than the transmitting area, depth information and a high-sensitivity image can be obtained at the same time.

DESCRIPTION OF EMBODIMENTS

Figure 1:
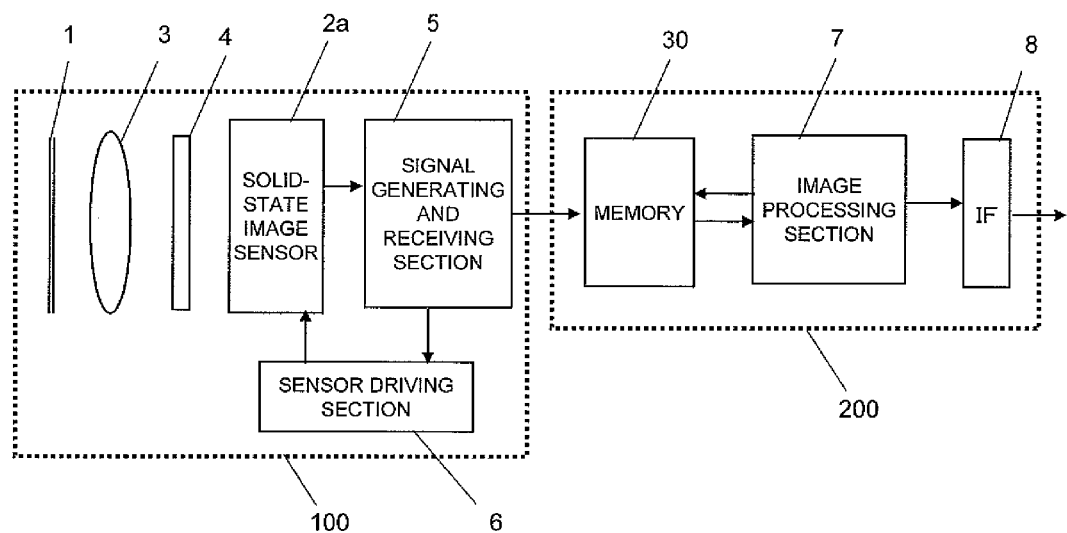
FIG. 1 A block diagram illustrating an overall configuration for an image capture device as a first exemplary embodiment.

Exemplary embodiments of the present invention are outlined as follows:

(1) A 3D image capture device as an embodiment of the present invention includes: a light transmitting section with a transmitting area, of which the spectral transmittance characteristic varies in a first direction; an image sensor which is arranged to receive light that has been transmitted through the light transmitting section and which outputs a photoelectrically converted signal representing the light received; an imaging section which produces an image on the image capturing plane of the image sensor; and an image processing section which extracts an edge of a subject in the first direction, which is included in an image that has been generated based on the photoelectrically converted signal supplied from the image sensor, and which estimates information about the depth of the subject based on lightness or hue pattern of a background in the vicinity of the edge extracted.

(2) In one embodiment, the transmission wavelength range of the transmitting area changes into three or more different ones in the first direction.

(3) In one embodiment of the 3D image capture device of (1) or (2), the transmitting area is designed so that when achromatic color light is transmitted through the transmitting area, the sum of transmitted light rays becomes the achromatic color light.

(4) In one embodiment, the 3D image capture device of one of (1) to (3) includes a rotating and driving section which rotates the transmitting area on a plane that intersects with an optical axis at right angles, and the image processing section extracts the edge of the subject by comparing to each other a plurality of images that have been obtained in mutually different rotation states.

(5) In one embodiment of the 3D image capture device of one of (1) to (4), the image processing section extracts the edge of the subject based on the difference between a first image obtained when the transmitting area was in a first state and a second image obtained when the transmitting area was in a second state, which is defined by rotating the transmitting area in the first state 180 degrees.

(6) In one embodiment of the 3D image capture device of one of (1) to (5), the spectral transmittance characteristic of the transmitting area changes continuously and periodically in the first direction.

(7) In one embodiment of the 3D image capture device of one of (1) to (6), the transmitting area has six areas which are arranged in the first direction and which transmit light rays falling within the wavelength ranges of the colors blue, cyan, green, yellow, red and magenta, respectively.

(8) In one embodiment of the 3D image capture device of one of (1) to (7), the image processing section estimates the depth of the subject by reference to information that has been collected in advance to define a relation between the depth of the subject and a lightness or hue pattern in pixels surrounding the edge.

(9) In one embodiment of the 3D image capture device of one of (1) to (8), the rest of the light transmitting section other than the transmitting area is transparent.

(10) In one embodiment of the 3D image capture device of one of (1) to (9), the image processing section generates a depth image, of which each pixel value is represented by the level of the depth, by reference to information indicating the estimated depth.

(11) In one embodiment of the 3D image capture device of one of (1) to (10), the image processing section generates a color image based on the photoelectrically converted signal supplied from the image sensor.

(12) A light transmitting section as an embodiment of the present invention may be used by the 3D image capture device of one of (1) to (11).

(13) An image processor as an embodiment of the present invention may be used by the 3D image capture device of one of (1) to (11). The image processor includes an image processing section which extracts an edge of a subject in the first direction, which is included in an image that has been generated based on the photoelectrically converted signal supplied from the image sensor, and which estimates information about the depth of the subject based on a lightness or hue pattern of a background in the vicinity of the edge extracted.

(14) An image processing program as an embodiment of the present invention may be used by the 3D image capture device of one of (1) to (11). The image processing program is defined so as to make a computer perform the steps of: extracting an edge of a subject in the first direction, which is included in an image that has been generated based on the photoelectrically converted signal supplied from the image sensor; and estimating information about the depth of the subject based on a lightness or hue pattern of a background in the vicinity of the edge extracted.

Hereinafter, embodiments of the present invention will be described in further detail with reference to the accompanying drawings. In the following description, any element shown in multiple drawings and having substantially the same function will be identified by the same reference numeral. It should be noted that a signal or information representing an image will be sometimes referred to herein as just an "image".

Embodiment 1

First of all, a 3D image capture device (which will be simply referred to herein as an "image capture device") as a first embodiment of the present invention will be described. FIG. 1 is a block diagram illustrating an overall configuration for an image capture device according to this embodiment. The image capture device of this embodiment is a digital electronic camera and includes an image capturing section 100 and a signal processing section 200 that receives a signal generated by the image capturing section 100 and outputs a signal representing an image (i.e., an image signal).

The image capturing section 100 includes a color solid-state image sensor 2a (which will be simply referred to herein as an "image sensor") with a number of photosensitive cells (pixels) that are arranged on its image capturing plane, a light-transmitting plate (light-transmitting section) 2, in which a striped color filter, of which the spectral transmittance characteristic varies in a particular direction, is arranged and which transmits incoming light, an optical lens 3 for producing an image on the image capturing plane of the color solid-state image sensor 2a, and an infrared cut filter 4. The image capturing section 100 further includes a signal generating and receiving section 5, which not only generates a fundamental signal to drive the color solid-state image sensor 2a but also receives the output signal of the color solid-state image sensor 2a and sends it to the signal processing section 200, and a sensor driving section 6 for driving the color solid-state image sensor 2a in accordance with the fundamental signal generated by the signal generating and receiving section 5. The color solid-state image sensor 2a is typically a CCD or CMOS sensor, which may be fabricated by known semiconductor device processing technologies. The signal generating and receiving section 5 and the sensor driving section 6 may be implemented as an LSI such as a CCD driver. In this description, the "spectral transmittance characteristic" refers herein to the wavelength dependence of a transmittance in the visible radiation wavelength range.

The signal processing section 200 includes an image processing section 7 which generates a color image and subject's depth information by processing the signal supplied from the image capturing section 100, a memory 30 for storing various kinds of data for use to generate the image signal, and an interface (I/F) section 8 for sending out the image signal and depth information thus generated to an external device. The image processing section 7 may be implemented appropriately as a combination of a hardware component such as a known digital signal processor (DSP) and a software program for use to perform image processing involving the image signal generation. The image processing section 7 not only generates a color image but also extracts an edge from the image and calculates depth information based on color information in the vicinity of the edge. Also, the image processing section 7 transforms the depth information into a luminance signal, thereby generating a monochrome image representing the distribution of depths. The memory 30 may be a DRAM, for example. And the memory 30 not only stores the signal supplied from the image capturing section 100 but also temporarily retains the image data that has been generated by the image processing section 7 or compressed image data. These image data are then output to either a storage medium or a display section (neither is shown) by way of the interface section 8.

The image capture device of this embodiment actually further includes an electronic shutter, a viewfinder, a power supply (or battery), a flashlight and other known components. However, the description thereof will be omitted herein because none of them are essential components that would make it difficult to understand how this embodiment works unless they were described in detail.

Next, the configuration of the image capturing section 100 will be described in further detail with reference to FIGS. 2 through 4. In the following description, the x and y coordinates shown in those drawings will be used.

Figure 2:
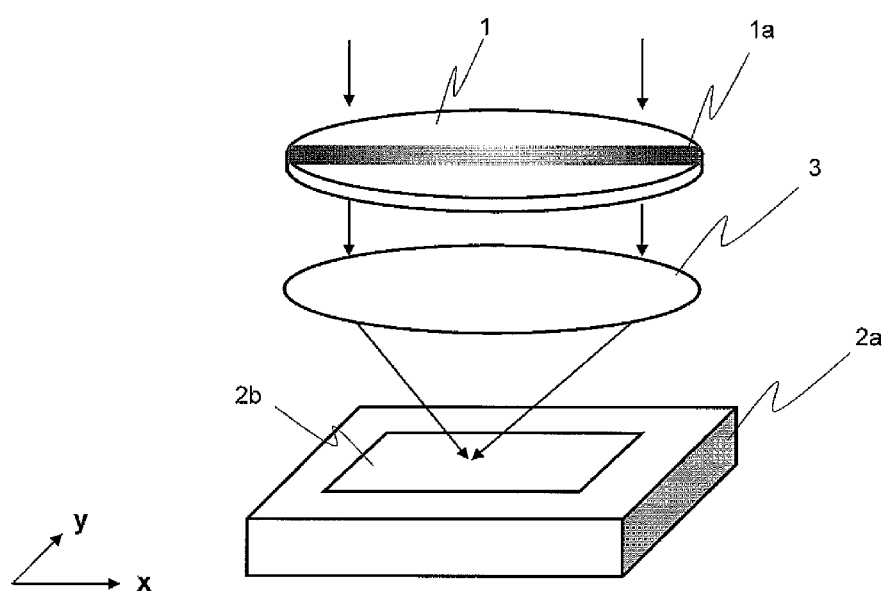
FIG. 2 Schematically illustrates a general arrangement of a light-transmitting plate, an optical lens and an image sensor in the first exemplary embodiment.

FIG. 2 schematically illustrates the relative arrangement of the light-transmitting plate 1, the lens 3 and the image sensor 2a in the image capturing section 100. It should be noted that illustration of the other elements is omitted in FIG. 2. The lens 3 may be a lens unit that is a group of lenses but is drawn in FIG. 2 as a single lens for the sake of simplicity. The light-transmitting plate includes a striped color filter (light transmitting area) 1a, of which the spectral transmittance characteristic varies in the horizontal direction, and transmits the incoming light. The lens 3 is a known lens and condenses the light that has been transmitted through the light-transmitting plate 1, thereby imaging the light on the image capturing plane 2a of the image sensor 2. In this description, the "horizontal direction" means the x direction shown in the drawings that are referred to, and is not necessarily the direction that is parallel to the surface of the ground.

Figure 3:
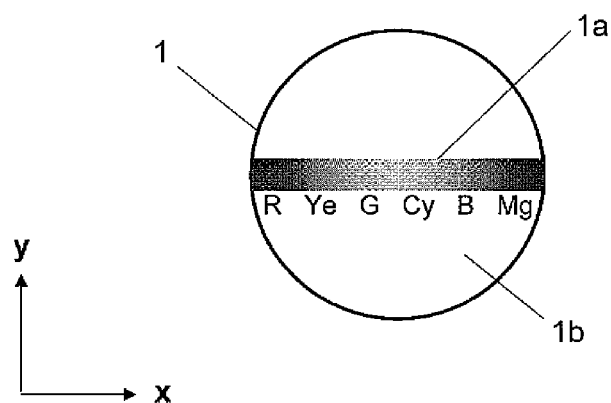
FIG. 3 A front view of the light-transmitting plate according to the first exemplary embodiment.

FIG. 3 is a front view of the light-transmitting plate 1 according to this embodiment. The light-transmitting plate 1 of this embodiment, as well as the lens 3, has a circular shape. The light-transmitting plate 1 has a striped color filter 1a which runs through its middle but the rest 1b of the plate 1 is transparent. This striped color filter 1a is characterized in that its transmission wavelength range gradually changes in the order of the colors red (R), yellow (Ye), green (G), cyan (Cy), blue (B) and magenta (Mg) from the left to the right on the drawing and that the sum of all of these colors becomes the color white. As a result, even though the waveform is different depending on what portion of the striped color filter 1a achromatic color light (i.e., white light) has transmitted, the sum of the transmitted light becomes achromatic color light as a whole. In this embodiment, the transmittances of the R, G and B portions of the filter are supposed to be substantially equal to each other and the transmittances of the Ye, Cy and Mg portions of the filter are supposed to be approximately twice as high as that of the R, G and B portions.

Figure 4:
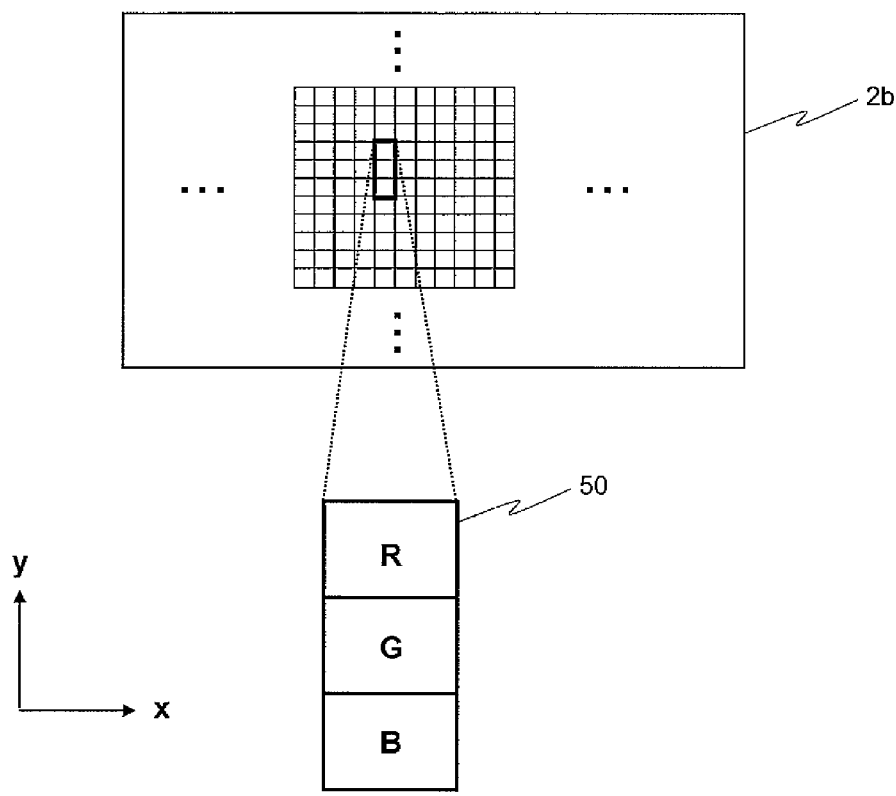
FIG. 4 Illustrates the basic color arrangement of the image capturing section of a solid-state image sensor according to the first exemplary embodiment.

FIG. 4 illustrates some of a plurality of photosensitive cells 5 which are arranged in columns and rows on the image capturing plane 2b of the image sensor 2a. Each of those photosensitive cells 50 is typically a photodiode, which performs photoelectric conversion and outputs an electrical signal representing the quantity of the light received (which will be referred to herein as a "photoelectrically converted signal" or a "pixel signal"). Color filters are arranged closer to the light source so as to face the respective photosensitive cells 50. As shown in FIG. 4, in this embodiment, the color filters have a horizontal striped arrangement, each fundamental unit of which is comprised of three color filters that are arranged in three rows and one column, and red (R), green (G) and blue (B) elements are arranged on the first, second and third rows, respectively. The color filter of each of these elements may be made of a known pigment, for example. The color filters of the red, green and blue elements selectively transmit light rays falling within the red, green and blue wavelength ranges, respectively.

According to such an arrangement, the light that has entered this image capture device during an exposure process passes through the light-transmitting plate 1, the lens 3, and the infrared cut filter 4, is imaged on the image capturing plane 2b of the image sensor 2a, and then is photoelectrically converted by each photosensitive cells 50. The photoelectrically converted signal is output from each photosensitive cell 50 to the signal processing section 200 via the signal generating and receiving section 5. In the signal processing section 200, the image processing section 7 colors the image and calculates depth information based on the signal supplied. The depth information is transformed into a luminance signal according to the level of its depth and is output as a monochrome image.

Next, it will be described how to perform an image capturing operation and image processing according to this embodiment.

Figure 5:
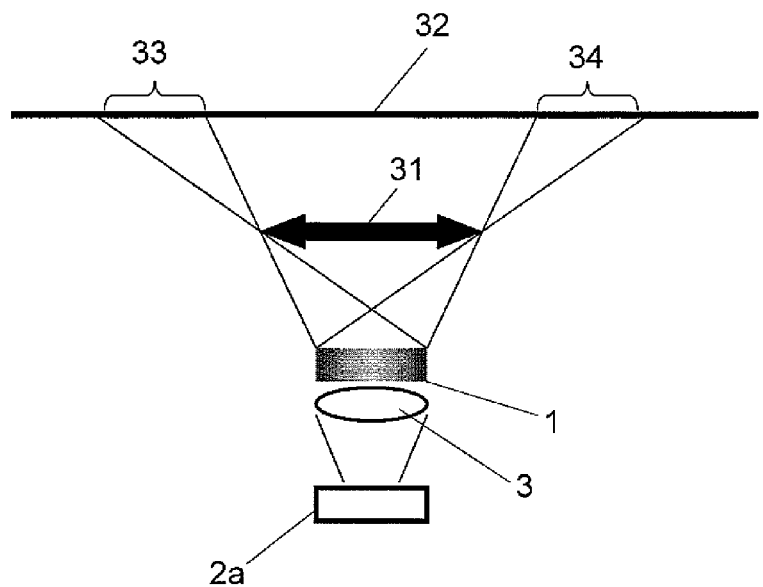
FIG. 5 Schematically illustrates how an image is shot according to the first exemplary embodiment.

FIG. 5 schematically illustrates a situation where images of a background 32 and a foreground subject 31 are captured through the light-transmitting plate 1. When their images are captured in the situation shown in FIG. 5, the image sensor 2a outputs a photoelectrically converted signal based on the light that has been reflected from the foreground subject 31 and the background 32. The photoelectrically converted signal is then sent from the image sensor 2a to the image processing section 7 via the signal generating and receiving section 5. The image processing section 7 performs the following two kinds of processing on the photoelectrically converted signal supplied, and outputs two images as the results of those two kinds of processing. Specifically, predetermined coloration processing is carried out as the first processing, thereby generating a color image. Next, as the second processing, an edge of the image is extracted, the depth is estimated based on the horizontal coloration in the vicinity of the edge, and a monochrome image, of which the image luminance value is represented by the level of the depth (which will be referred to herein as a "depth image"), is generated. Hereinafter, it will be described more specifically how to generate the color image and the depth image.

Figure 6:
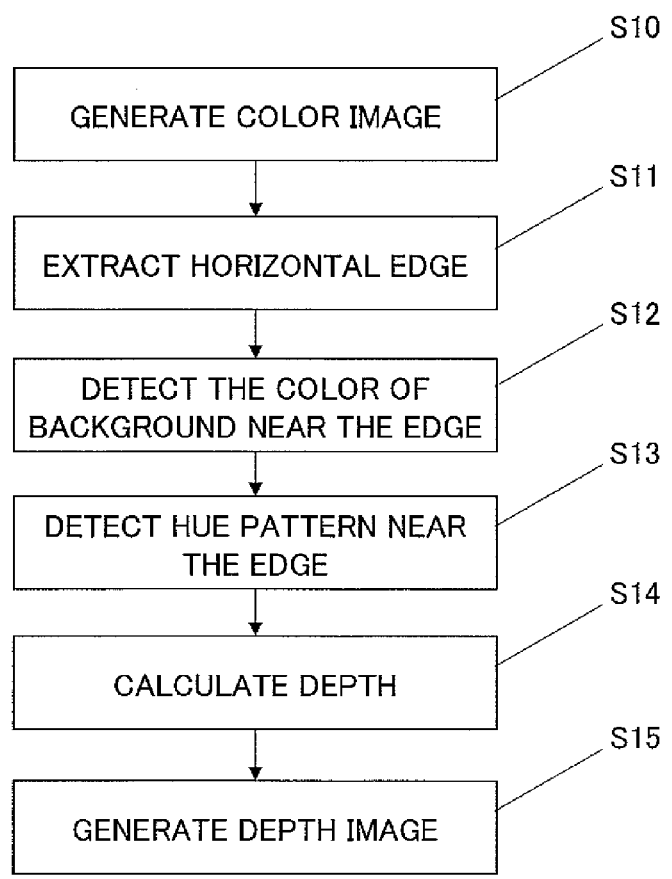
FIG. 6 A flowchart showing the procedure of the image processing according to the first exemplary embodiment.

FIG. 6 is a flowchart showing the procedure of the image generation processing according to this embodiment. First, in Step S10, the image processing section 7 generates a color image based on the photoelectrically converted signal that has been generated by the image sensor 2a. Next, in Step S11, the image processing section 7 extracts a horizontal edge of the subject which is included in the color image generated. Then, in Step S12, the image processing section 7 detects the color of the background in the vicinity of the edge. Thereafter, in Step S13, the image processing section 7 detects a hue pattern of pixels in the vicinity of the edge. Next, in Step S14, the image processing section 7 calculates the subject's depth based on the hue pattern of pixels in the vicinity of the edge. Finally, in Step S15, the image processing section 7 generates a depth image based on the level of the depth calculated. Hereinafter, these processing steps will be described in detail one by one.

First of all, in Step S10, a color image is generated based on the output of the image sensor 2a. In this embodiment, the image sensor 2a has a horizontal stripe arrangement of RGB. That is why RGB signals (i.e., color signals) can be obtained directly by using three pixels that are arranged in three rows and one column as a unit, and color image is generated based on these color signals. Particularly, since the horizontal stripe color arrangement shown in FIG. 4 is used according to this embodiment, a color image with high horizontal resolution can be generated. Since the striped color filter 1a is arranged in this embodiment to run through the middle of the light-transmitting plate 1, light is partially absorbed into the color filter 1a and some quantity of the light is lost. However, the rest of the light is not lost but is photoelectrically converted. In addition, according to this embodiment, the color scheme of the striped color filter 1a includes not only primary colors (R, G, B) but also complementary colors (Ye, Cy, Mg) as well. That is why higher optical transmittance is achieved than in an arrangement that uses only primary color filters. On top of that, since the sum of the light rays that are transmitted through the striped color filter 1a is white light, basically the subject image is not colored by the striped color filter 1a. Thus, it can be seen that a color image, of which the sensitivity and color properties have no problem at all, can be generated by setting the size of the striped color filter 1a to be sufficiently small.

Next, in Step S11, the image processing section 7 extracts a horizontal edge of the image that has been obtained by capturing (i.e., the image captured). The edge of the image can be extracted by several methods, any of which may be adopted. In this embodiment, the edge is supposed to be extracted based on the result of the color image generation processing described above. Specifically, first of all, color components are removed from the color image that has been obtained through the color image generation processing described above, thereby obtaining a monochrome image. Next, a signal difference is calculated between two horizontally adjacent pixels of the monochrome image. And if the differential value is equal to or greater than a preset level, then that part is regarded as the horizontal edge of the image. By performing such signal difference processing on the entire image, the image processing section 7 extracts horizontal edges.

Subsequently, in Step S12, the color of the background in the vicinity of the edge extracted is detected. The color is detected from an area that is located on the left-hand side of the edge (e.g., corresponding to the left image capturing area 33 shown in FIG. 5) in the left half of the image and from an area that is located on the right-hand side of the edge (e.g., corresponding to the right image capturing area 34 shown in FIG. 5) in the right half of the image. It should be noted that the specific area widths (i.e., the numbers of horizontal pixels) of the left and right areas 33 and 34 are set so as to correspond to the expected depth range of the image capturing area.

For example, suppose the color of the right image capturing area shown in FIG. 5 is white and the area ratio of the striped color filter 1a of the light-transmitting plate 1 shown in FIG. 3 to the other transparent area 1b is 1:k. In that case, the image areas corresponding to the left and right image capturing areas 34 and 34 are affected by the striped color filter 1a and their colors change continuously in the horizontal direction. For instance, a light ray that has been incident on the image sensor 2a from the leftmost portion of the right image capturing area 34 shown in FIG. 5 transmits only through the right end (Mg area) of the striped color filter 1a, and therefore, pixels corresponding to that portion are colored Mg. On the other hand, since a light ray that has come from the rightmost portion of the right image capturing area 34 transmits only through the entire striped color filter 1a and then impinges on the image sensor 2a, pixels corresponding to that portion are not colored.

Figure 7:
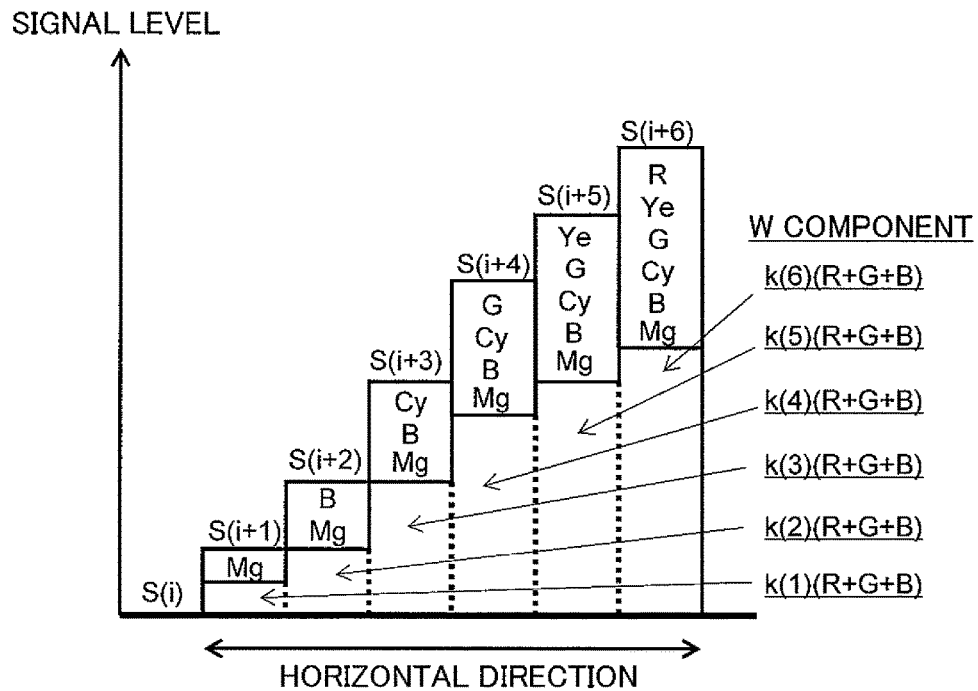
FIG. 7 Illustrates the pixel signals of a right image capturing area in the first exemplary embodiment.

FIG. 7 schematically illustrates the signal levels of six horizontal pixels on the image that correspond to the right image capturing area 34. As shown in FIG. 7, the signal levels increase from a pixel corresponding to the leftmost portion of the right image capturing area 34 toward a pixel corresponding to the rightmost portion thereof. In FIG. 7, signals representing seven pixels that are arranged horizontally are identified by $S(i)$, $S(i+1)$, $S(i+2)$ ... and $S(i+6)$ and an edge is supposed to be present in the boundary between $S(i)$ and $S(i+1)$. Also, W ($=R+G+B$) component of each pixel signal is identified by k(j) and j=1 to 6 and k(6)=k are supposed to be satisfied. If a signal indicating the intensity of each color component included in one of these signals is represented by the sign indicating that color component (Mg, B, Cy, G, Ye, R), a pixel signal S(i+1) corresponding to the leftmost portion of the right image capturing area 34 is represented by Mg+k(1) (R+G+B). A pixel signal S(i+6) corresponding to the rightmost portion of the right image capturing area 34 is represented by (Mg+B+Cy+G+Ye+R)+k(6)(R+G+B). In the same way, as for the other pixel signals, S(i+2) is represented by (Mg+B)+k(2) (R+G+B), S(i+3) is represented by (Mg+B+Cy)+k(3) (R+G+B), S(i+4) is represented by (Mg+B+Cy+G)+k(4) (R+G+B), and S(i+5) is represented by (Mg+B+Cy+G+Ye)+ k(5) (R+G+B). In this case, however, the pixel unit is supposed to be comprised of the three pixels that are arranged in three rows and one column shown in FIG. 4 and those three pixels are supposed to form a single pixel.

After all, in the entire right image capturing area 34, the sum of the pixel signals is represented by 9R+9G+15B+Σk (j) (R+G+B) and the RGB signal ratio becomes R:G:B=(9+Σk(j)):(9+Σk(j)):(15+Σk(j)). As k(j) is a known number determined by the lens shape, this RGB ratio can be obtained. As the RGB ratio varies according to the color of the background in the vicinity of an edge, the color of the background can be determined by obtaining the RGB ratio. For example, if the RGB ratio is close to R:G:B=0:(9+Σk(j)):(15+Σk(j)), the background color can be determined to be Cy. In this embodiment, a database that associates an RGB ratio with its corresponding background color is collected in advance and stored in the memory 30. By reference to that database, the image processing section 7 detects the color of the background area in the vicinity of an edge based on the RGB ratio of pixels in the vicinity of the edge on the image.

In Step S13, the hue pattern in an area surrounding the edge is detected. Specifically, signals representing the color components that have been detected in Step S12 are removed from respective pixel signals in the edge surrounding area and then the difference is calculated between the pixels, thereby calculating a color component. For instance, since the color of the right image capturing area 34 is white in the example shown in FIG. 7, a white component k(j) (R+G+B) is removed from the respective pixel signals S(i+1), S(i+2) and so on. Then, the pixel signals S(i+1) to S(i+6) in the right image capturing area 34 are represented by the following Equations (1) through (6):

$$S(i+1)=Mg \tag{1}$$

$$S(i+2)=Mg+B \tag{2}$$

$$S(i+3)=Mg+B\pm Cy \tag{3}$$

$$S(i+4)=Mg+B\pm Cy+G \tag{4}$$

$$S(i+5)=Mg+B\pm Cy+G+Ye \tag{5}$$

$$S(i+6)=Mg+B\pm Cy+G+Ye+R \tag{6}$$

By further calculating the differences between the respective pixel signals, the following Equations (7) through (11) can be obtained. In Equations (7) through (11), the pixel difference signal Djk is supposed to be calculated by Djk=S(i+k)−S(i+j).

$$D12=S(i+2)-S(i+1)=B \tag{7}$$

$$D23=S(i+3)-S(i+2)=Cy \tag{8}$$

$$D34=S(i+4)-S(i+3)=G \tag{9}$$

$$D45=S(i+5)-S(i+4)=Ye \tag{10}$$

$$D56=S(i+6)-S(i+5)=R \tag{11}$$

As a result of these computations, by combining D12 through D56 and S(i+1), signals Mg through R representing the colors of the striped color filter 1*a* when the light source is white can be calculated. It can be said that this is equivalent to calculating the colors to be transmitted through the striped color filter using the color of the edge surrounding areas such as the right and left image areas 34 and 33 as the color of a light source.

In Step S14, a property of the color pattern surrounding the edge is examined and the depth corresponding to that property is calculated. In this description, the depth refers herein to the distance from the subject 31 to the background 32 shown in FIG. 5. If the depth/distance is short, then the hue pattern is limited. Conversely, if the depth/distance is long, then the hue pattern range expands. That is to say, there is a correlation between the subject's (31) depth information and the hue pattern in the vicinity of the edge. In this embodiment, data representing that correlation is provided in advance and stored in the memory 30. By reference to that correlation data, the image processing section 7 calculates the depth based on the hue pattern at the edge.

Figure 8:
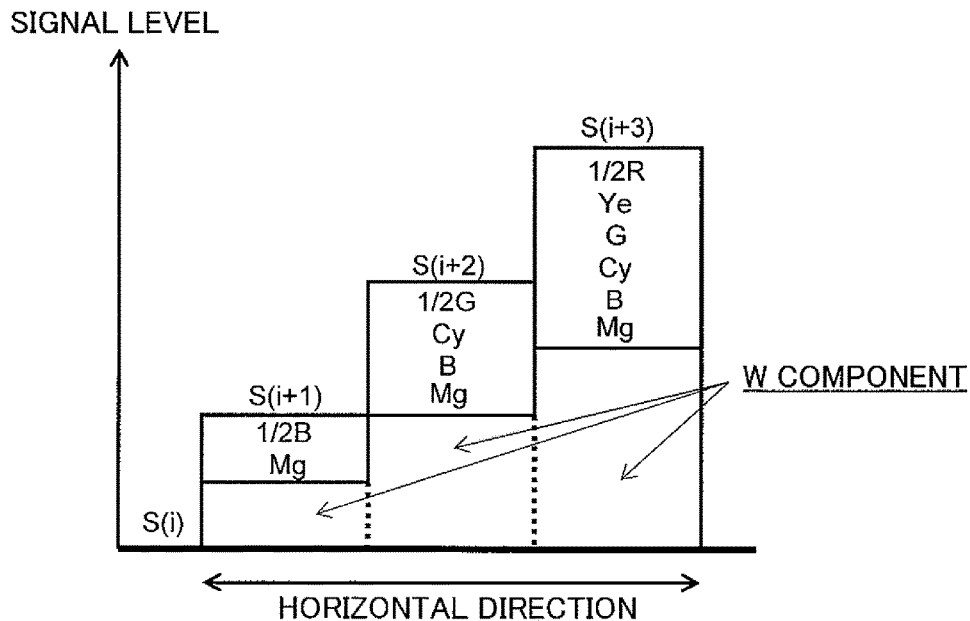
FIG. 8 Illustrates the pixel signals of a right image capturing area in the first exemplary embodiment (in a situation where the distance from the foreground subject to the background is halved).

For example, if in a situation where the hue pattern in the right image capturing area 34 is represented by Equation (1) and Equations (7) through (11) (i.e., in a situation where six colors can be obtained from six pixels) the distance from the foreground subject 31 to the background 32 becomes a half, then three colors can be obtained from three pixels as shown in FIG. 8. Thus, it can be seen that there is a correlation between the hue pattern obtained and the distance from the foreground subject 31 to the background 32. The image processing section 7 of this embodiment obtains depth information based on that correlation. Nevertheless, the depth information is not absolute distance information as in the example described above but just a piece of relative information.

Next, in Step S15, the depth information that has been obtained in Step S14 is transformed into brightness information (i.e., a monochrome image). Specifically, the image processing section 7 scans the captured image horizontally, and calculates the depth every time an edge is detected. Then, pieces of depth information calculated are accumulated and added together, thereby calculating a maximum depth value. By using the maximum depth value as a maximum brightness value, the brightness of each pixel is determined. For example, in transforming the depth information into an eight-bit monochrome image, the information can be transformed into an image with a maximum luminance value of 255.

As can be seen from the foregoing description, by arranging the light-transmitting plate 1 with the striped color filter 1*a* in the color image capturing system, the image capture device of this embodiment can obtain not only a color image with only a little loss of light but also the subject's depth image. According to this embodiment, by extracting an edge from the color image obtained and by examining the hue of the colors in the area surrounding that edge, a relative depth between the subjects can be calculated, which is very advantageous. On top of that, as information about the relative depth between the subjects can be obtained, information about the subject's depth with respect to the image capture device's position can also be obtained by making computations based on that relative depth information.

In the foregoing description, each filter portion of the striped color filter 1a is supposed to be configured to transmit only a light ray falling within its associated particular wavelength range but not to transmit any other light ray. Also, the R, G and B filter portions are supposed to have substantially the same transmittance and the transmittance of the Ye, Cy and Mg filter portions is supposed to be approximately twice as high as that of the R, G and B filter portions. However, the striped color filter 1a does not have to satisfy these conditions exactly. Naturally, these conditions are ideally satisfied but even if the characteristic of the striped color filter 1a varied from the ideal one, there would be no problem if the signal processing described above is corrected so as to compensate for that variation.

In the embodiment described above, the color scheme of the striped color filter 1a of the light-transmitting plate 1 is supposed to be comprised of red (R), yellow (Ye), green (G), cyan (Cy), blue (B) and magenta (Mg). However, this is only an example and any other color scheme may be adopted as well. Furthermore, the number of different color schemes of the striped color filter 1a does not have to be seven. Nevertheless, in order to increase the accuracy of calculating the depth, it is recommended that there be at least three different color schemes. Also, in order to obtain an image that can be used as a color image with no problem, the sum of all colors of the striped color filter 1a suitably becomes the color white as in the embodiment described above. But the sum does not have to be exactly the color white. However, if a striped color filter 1a, of which the sum of all colors is close to the color white, is used, the image obtained can be used as a color image with no problem at all and yet the depth information can also be calculated.

Furthermore, in the embodiment described above, the basic color arrangement of the color image sensor 2a is supposed to be an RGB horizontal stripe arrangement. However, this is only an example. Alternatively, any other basic color arrangement consisting of three or more colors may also be used. For example, even though the depth cannot be calculated as accurately as with the horizontal stripe arrangement, a Bayer arrangement consisting of red, blue and two green elements may also be used with no problem at all. Also, although the condenser lens 3 and the light-transmitting plate 1 are supposed to be circular, the effects will not be affected at all even if the condenser lens 3 and the light-transmitting plate 1 have a quadrangle or any other arbitrary shape. Furthermore, even though the color filter 1a of the light-transmitting plate 1 is supposed to have a striped shape, this is only an example and the color filter may also cover the entire surface of the light-transmitting plate 1. For example, if a filter, of which the hue (i.e., transmission wavelength range) changes in the rotating direction and the color depth (i.e., transmittance) changes in the radial direction as in a Munsell color ring, is used, then depth can be calculated not just in the horizontal direction but also in every other direction as well. Still alternatively, a filter, of which the transmission wavelength range or transmittance changes concentrically, may also be used. In any of these filters, the transmittance characteristic is suitably designed so that the sum of the transmitted light rays becomes close to white light.

It should be noted that the arrangement of the respective members shown in FIG. 2 is only an example. And the present invention is in no way limited to that specific example. Alternatively, as long as an image can be produced on the image capturing plane 2b, the lens 3 may be arranged more distant from the image sensor 2a than the light-transmitting plate 1 is. Still alternatively, the lens 3 and the light-transmitting plate 1 may also be implemented as a single optical element.

In the embodiment described above, the image processing section 7 generates a color image and a depth image at the same time. However, the image processing section 7 may generate only a depth image without generating any color image. Alternatively, the image processing section may also be configured to generate only depth information, not any depth image, by performing the processing described above. Furthermore, the image processing of this embodiment may also be carried out by another device that is provided independently of that image capture device. For example, even if a signal that has been obtained by an image capture device including the image capturing section 100 of this embodiment is loaded into another device (image processor) to get a program defining the signal arithmetic processing described above executed by a computer built in that image processor, the effects of the embodiment described above can also be achieved.

Embodiment 2

Hereinafter, a second embodiment of the present invention will be described. In this embodiment, a rotating mechanism is attached to the light-transmitting plate 1 and rotates the light-transmitting plate 1 on a plane that intersects with the optical axis at right angles, thereby getting images captured twice in a row. In the other respects, however, the configuration of this second embodiment is the same as that of the first embodiment, and their common features will not be described all over again to avoid redundancies.

Figure 9:
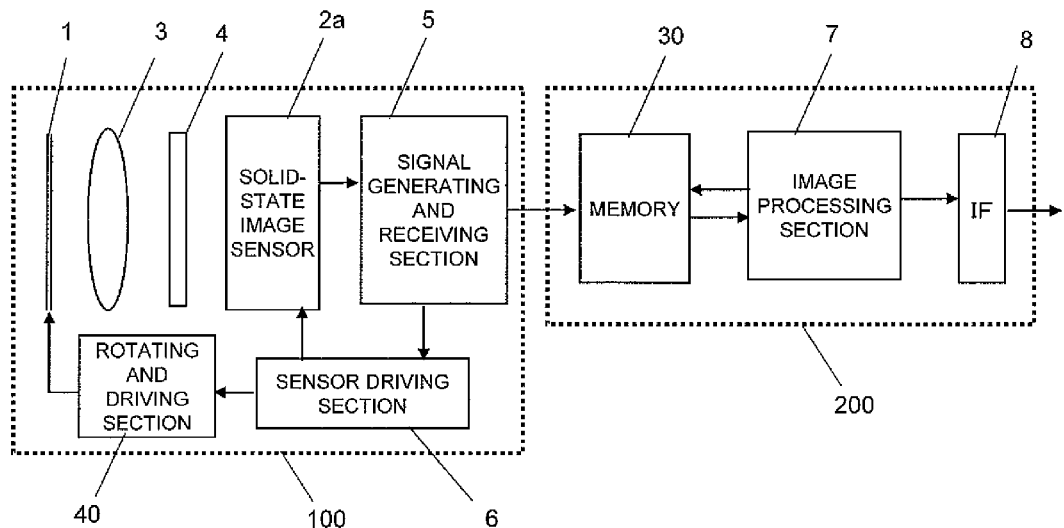
FIG. 9 A block diagram illustrating an overall configuration for an image capture device as a second exemplary embodiment.

FIG. 9 is a block diagram illustrating an overall configuration for an image capture device according to this embodiment. The image capture device of this embodiment includes a rotating and driving section 40 as a rotating mechanism. The rotating and driving section 40 has a motor that rotates the light-transmitting plate 1 and turns the light-transmitting plate 1 in accordance with an instruction given by the sensor driving section 6. Specifically, as disclosed in Non-Patent Document No. 1, the light-transmitting plate 1 may be rotated by putting a belt on the light-transmitting plate 1 and by running the belt with a motor.

Figure 10:
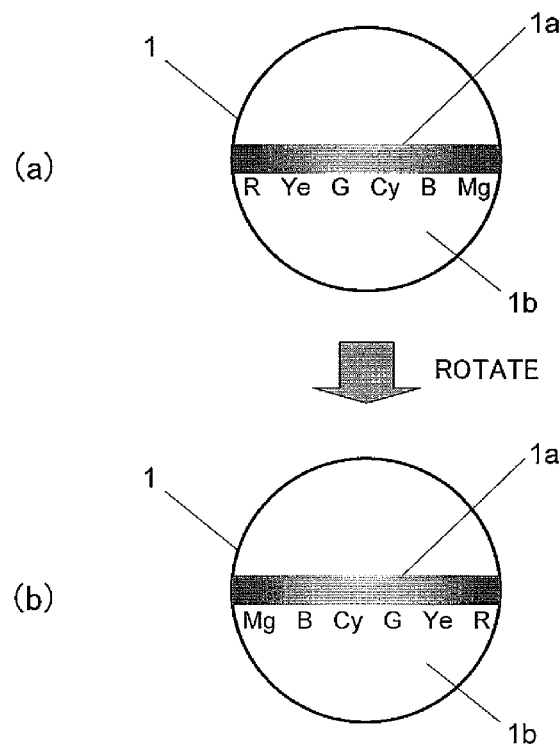
FIG. 10 Illustrates the rotation operation of a light-transmitting plate according to the second exemplary embodiment.

Hereinafter, it will be described how to perform an image capturing operation according to this embodiment. shown in FIG. 10, the image capture device captures an image once with the striped color filter 1a of the light-transmitting plate 1 kept parallel to the horizontal direction (see portion (a)), turns the light-transmitting plate 1 180 degrees, and captures an image once again (see portion (b)). These two images captured are subjected to differential processing and different portions as image data are extracted based on the result of the differential processing. In this manner, areas on the image corresponding to the left and right image capturing areas 33 and 34 can be located Even though the left and right image capturing areas 33 and 34 cannot be located exactly according to the first embodiment described above, those areas can be located accurately according to this embodiment. The reason is that the pixels that define the left and right image capturing areas 33 and 34 come to have different signal levels as the color scheme of the striped color filter 1a changes every time an image is captured. That is why based on the difference between these two images, the left and right image capturing areas 33 and 34 can be located accurately. Once the left and right image capturing areas 33 and 34 have been located, the same processing is carried out as in the first embodiment described above. According to this embodiment, since the left and right image capturing areas 33 and 34 can be located exactly, the depth can be calculated more accurately.

As can be seen, according to this embodiment, by rotating the light-transmitting plate 1 180 degrees and capturing images twice before and after the rotation, the left and right image capturing areas 33 and 34 can be located accurately based on the difference between the two images captured. Consequently, the depth can be calculated even more accurately.

Even though images are supposed to be captured twice according to this embodiment by getting the light-transmitting plate 1 rotated 180 degrees by the rotating and driving section 40, the angle of rotation and the number of times of capturing images may be changed. For example, two pairs of multi-viewpoint images, which are located at the upper, lower, right and left corners, respectively, may also be generated by performing image capturing operations four times with the light-transmitting plate 1 rotated 90 degrees each time.

Embodiment 3

Hereinafter, a third embodiment of the present invention will be described. In this embodiment, the striped color filter 1a of the light-transmitting plate 1 is arranged as in the first embodiment described above but its spectral transmittance characteristic changes differently from in the first embodiment. Specifically, the striped color filter 1a of this embodiment has the color grey (i.e., has no wavelength selectivity) and its transmittance changes periodically in the horizontal direction (i.e., in the x direction). Since the color filter 1a is a grey filter, the depth is calculated according to this embodiment based on the luminance signal of a color image, not RGB pixel signals. Thus, the following description of the third embodiment will be focused on only those differences from the first embodiment and their common features will not be described all over again to avoid redundancies.

Figure 11:
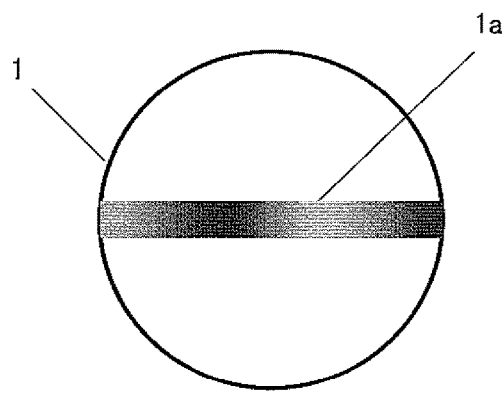
FIG. 11 A front view of a light-transmitting plate according to the second exemplary embodiment.
Figure 12:
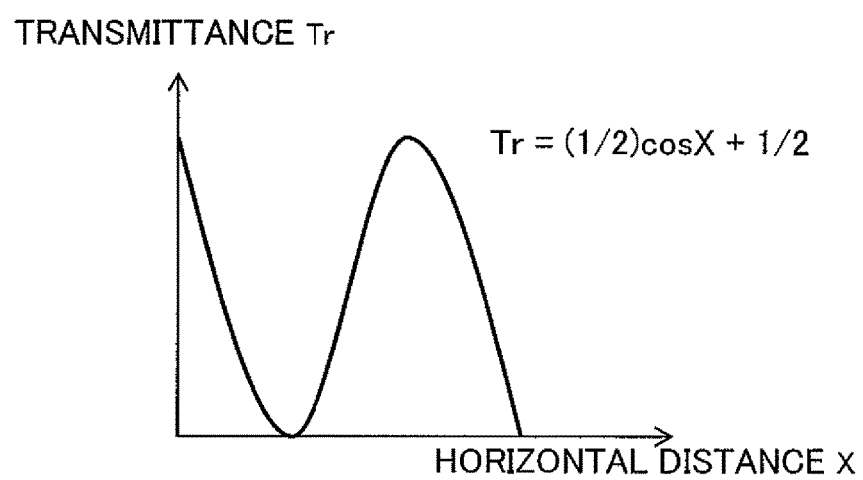
FIG. 12 A graph showing the transmission characteristic of a striped color filter according to the second exemplary embodiment.

FIG. 11 is a front view of the light-transmitting plate 1 according to this embodiment. In this embodiment, the striped color filter 1a does not have wavelength selectivity but its transmittance changes just like a cos function and becomes outstandingly high at two points and very low at two points. FIG. 12 is a graph showing how its transmittance changes. In FIG. 12, the abscissa represents a coordinate x on the color filter 1a and the ordinate represents a transmittance Tr, which can be calculated by the following Equation (12):

$$Tr = (1/2)\cos X + 1/2 \qquad (12)$$

If a striped color filter 1a with such a transmittance distribution is used, the luminance values of image areas corresponding to the left and right image capturing areas 33 and 34 are obtained by finding an integral of the transmittance of the striped color filter 1a horizontally. In this embodiment, since the optical transmittance Tr is a periodic function represented by Equation (12), its integral value $\Sigma Tr$ can be represented as the sum of a term of the periodic function and a term of the linear function as in the following Equation (13):

$$\Sigma Tr = (1/2)\sin X + (1/2)X \qquad (13)$$

Figure 13:
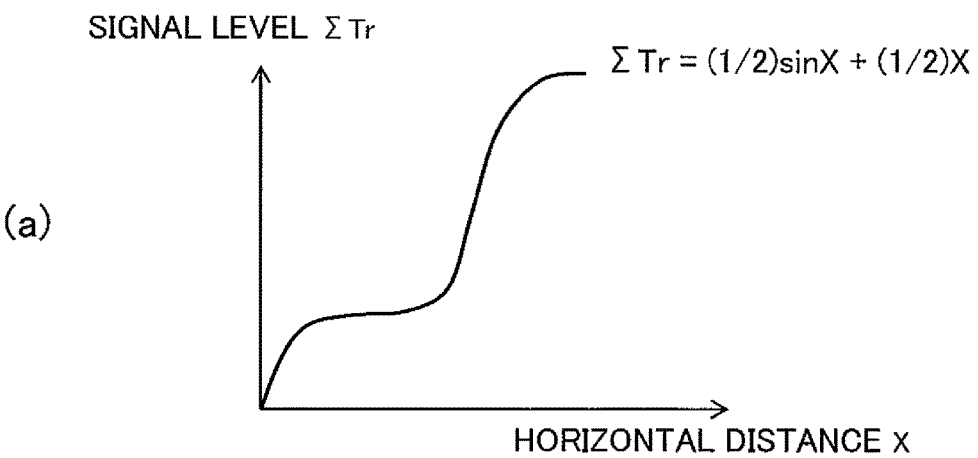
FIG. 13 (*a*) shows how the signal ΣTr changes with the horizontal distance X in a third exemplary embodiment and (*b*) shows how the signal ΣTr−(1/2)X changes with the horizontal distance X in the third exemplary embodiment.
Figure 13:
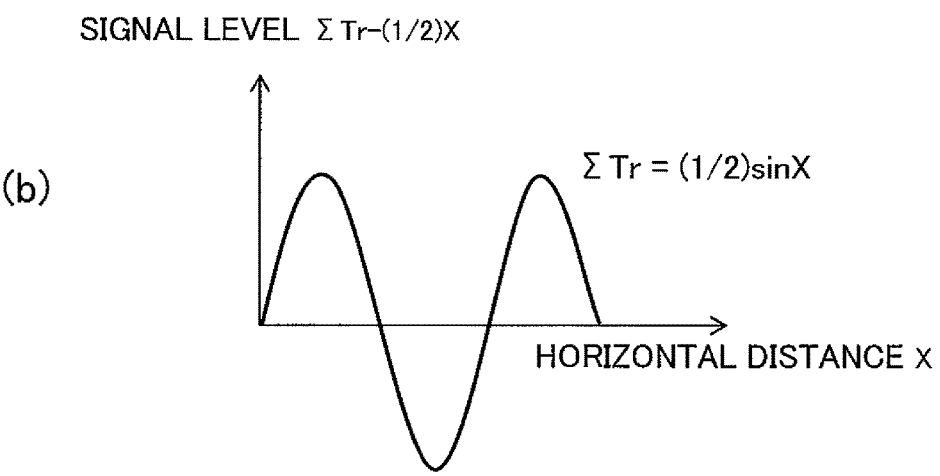
Figure 14:
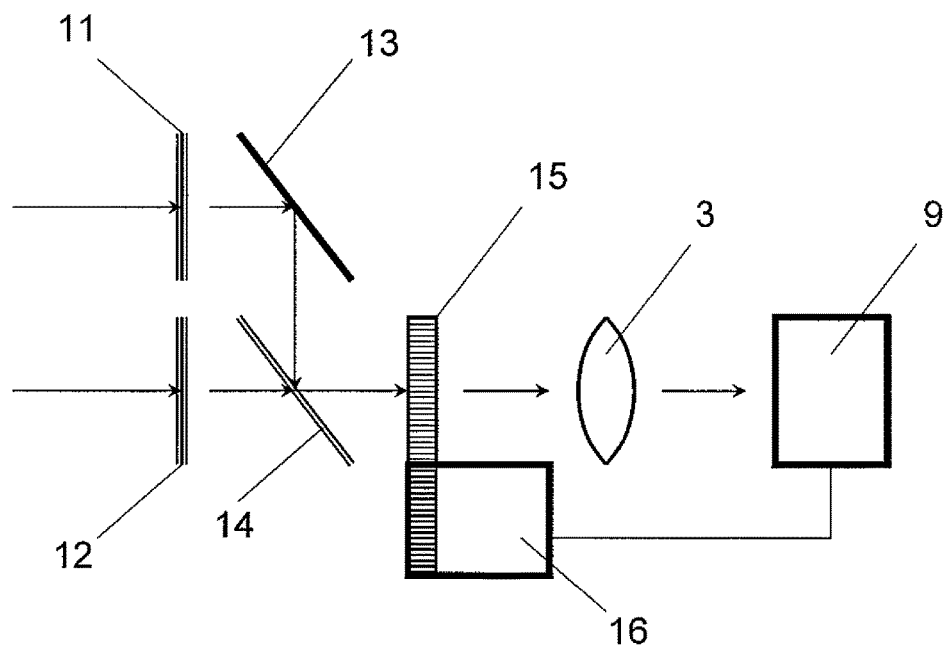
FIG. 14 Illustrates the arrangement of an image capturing system according to Patent Document No. 1.
Figure 15:
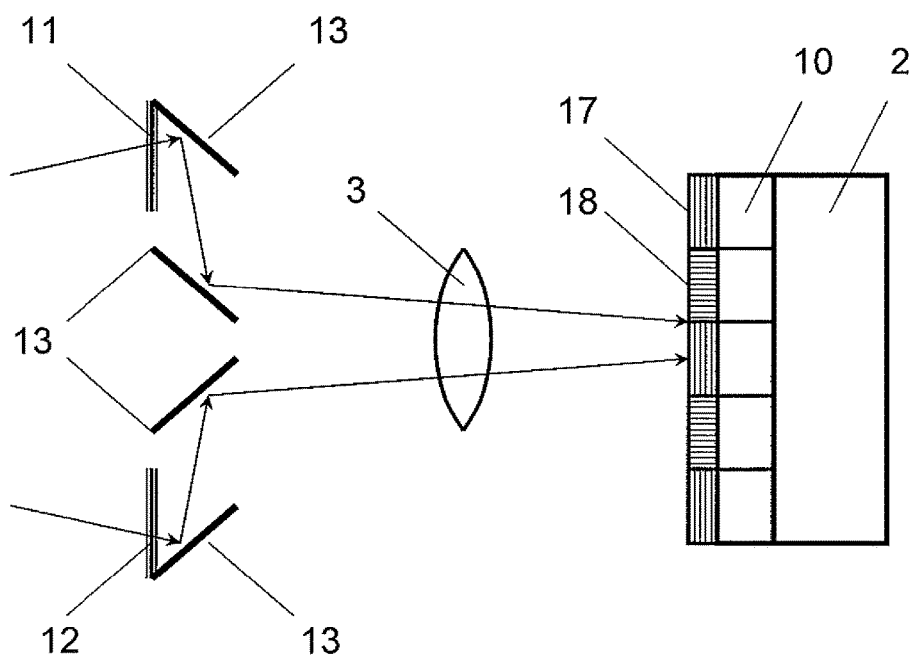
FIG. 15 Illustrates the arrangement of an image capturing system according to Patent Document No. 2.
Figure 16:
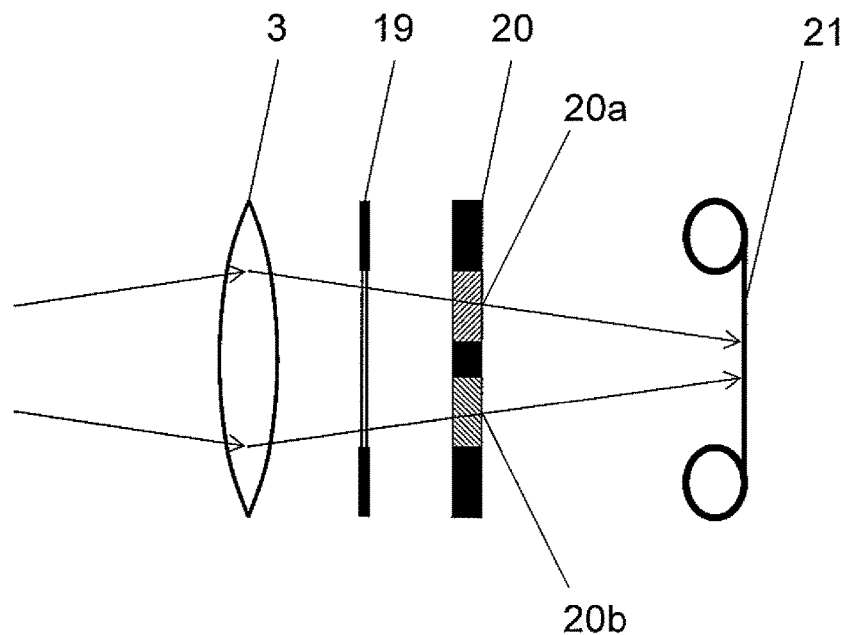
FIG. 16 Illustrates the arrangement of an image capturing system according to Patent Document No. 4.
Figure 17:
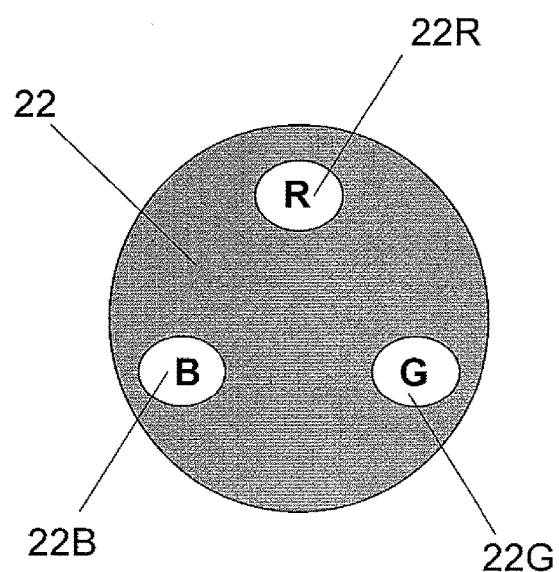
FIG. 17 Illustrates the appearance of a light beam confining plate according to Patent Document No. 5.
Figure 18:
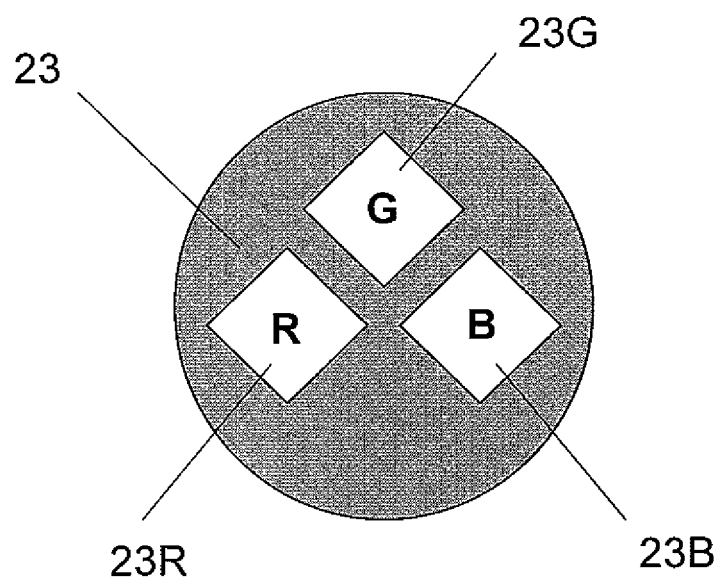
FIG. 18 Illustrates the appearance of a light beam confining plate according to Patent Document No. 6.

FIG. 13(a) is a graph showing the integral value E Tr given by Equation (13). The periodic function of the first term before and after the integral operation is characterized by its waveform that does not change because the cos function just turns into a sin function. Thus, the image processing section 7 of this embodiment removes a signal corresponding to the linear function term of Equation (13) from pixel signals corresponding to the left and right image capturing areas 33 and 34 and then analyzes the waveforms of signals of multiple pixels that are arranged horizontally. FIG. 13(b) is a graph showing a function that is obtained by removing a linear function term from Tr represented by Equation (13). The image processing section 7 detects a similar waveform to that of the periodic function shown in FIG. 13(b) from the pixel signals of multiple pixels corresponding to the left and right image capturing areas 33 and 34 and analyzes that waveform, thereby measuring the depth. Specifically, information representing the relation between the depth and the waveform of the periodic function (e.g., wavelength) is collected in advance and stored in the memory 30. By reference to that information, the image processing section 7 obtains the depth based on the waveform of the periodic function that is based on the image data.

As described above, according to this embodiment, a light-transmitting plate 1, of which the striped color filter 1a has the color grey and of which the transmittance changes periodically in the horizontal direction, is used. With such a configuration adopted, the waveform of a periodic function appears in the luminance values of image areas corresponding to the left and right image capturing areas 33 and 34 and the depth can be calculated based on that waveform. Consequently, according to this embodiment, information about the depth of the subject can be estimated based on a lightness pattern of the background in the vicinity of an edge.

In the embodiment described above, the striped color filter 1a of the light-transmitting plate is supposed to have the color grey. However, this is only an example. The striped color filter 1a may have any other color as long as its transmittance changed periodically. Also, as the depth information is estimated based on the luminance signals of respective pixels, the striped color filter 1a may also have wavelength selectivity. Even if the spectral transmittance characteristic pattern of the striped color filter 1a is different from what has already been described, the depth information can also be obtained by performing signal processing according to the pattern of its spectral transmittance characteristic.

Also, since luminance signals are used to calculate the depth information in the embodiment described above, the image sensor 2a does not have to be a color image sensor but may also be a monochrome image sensor as well. Furthermore, the edge may also be extracted according to this embodiment by rotating the light-transmitting plate 1 as in the second embodiment described above.

INDUSTRIAL APPLICABILITY

A 3D image capture device according to an embodiment of the present invention can be used effectively in any camera that ever uses a solid-state image sensor. Examples of those cameras include consumer electronic cameras such as digital cameras and digital camcorders and solid-state surveillance cameras for industrial use.

REFERENCE SIGNS LIST 1 light-transmitting plate
1a striped color filter
1b transparent area
2 solid-state image sensor
2a color solid-state image sensor 2b image capturing plane
3 optical lens
4 infrared cut filter
5 signal generating and receiving section
6 sensor driving section
7 image processing section
8 image interface section
9 image capture device
10 pixel
11 0-degree-polarization polarizer
12 90-degree-polarization polarizer
13 reflective mirror
14 half mirror
15 circular polarization filter
16 driver that rotates polarization filter
17, 18 polarization filter
19 lens diaphragm
20, 22, 23 light beam confining plate
20a color filter that transmits red-based ray
20b color filter that transmits blue-based ray
21 photosensitive film
22R, 23R R ray transmitting area of light beam confining plate
22G, 23G G ray transmitting area of light beam confining plate
22B, 23B B ray transmitting area of light beam confining plate
30 memory
31 foreground subject
32 background
33 left image capturing area
34 right image capturing area
40 rotating and driving section
50 pixel

The invention claimed is:

1. A 3D image capture device comprising:
a light transmitting section with a transmitting area, wherein the transmitting area has at least three areas which are arranged in the first direction and which transmit light rays falling within respective different wavelength ranges;
an image sensor which is arranged to receive light that has been transmitted through the light transmitting section and which outputs a photoelectrically converted signal representing the light received;
an optical lens which produces an image on the image capturing plane of the image sensor; and
an image processor configured to:
receive the image that has been generated based on the photoelectrically converted signal supplied from the image sensor;
identify a subject in the image;
identify an edge of the subject, wherein the edge lies along the first direction;
identify a background in the vicinity of the edge and separate from the subject;
determine a magnitude of variation in the first direction of a lightness or hue of the background, wherein the determined magnitude of variation corresponds to a number of levels having a different intensity or a number of different colors of the background, respectively;
estimate a distance between the subject and the background based on the determined magnitude of variation and a predetermined correlation between the magnitude of variation and distance, wherein a larger determined magnitude of variation corresponds to a larger estimated distance.

2. The 3D image capture device of claim 1, wherein the transmission wavelength range of the transmitting area changes into three or more different ones in the first direction.

3. The 3D image capture device of claim 1, wherein the transmitting area is designed so that when achromatic color light is transmitted through the transmitting area, the sum of transmitted light rays becomes the achromatic color light.

4. The 3D image capture device of claim 1, comprising a motor which rotates the transmitting area on a plane that intersects with an optical axis at right angles,
wherein the image processor identifies the edge of the subject by comparing to each other a plurality of images that have been obtained in mutually different rotation states.

5. The 3D image capture device of claim 4, wherein the image processor identifies the edge of the subject based on the difference between a first image obtained when the transmitting area was in a first state and a second image obtained when the transmitting area was in a second state, which is defined by rotating the transmitting area in the first state 180 degrees.

6. The 3D image capture device of claim 1, wherein the spectral transmittance characteristic of the transmitting area changes continuously and periodically in the first direction.

7. The 3D image capture device of claim 1, wherein the transmitting area has six areas which are arranged in the first direction and which transmit light rays falling within the wavelength ranges of the colors blue, cyan, green, yellow, red and magenta, respectively.

8. The 3D image capture device of claim 1, wherein the rest of the light transmitting section other than the transmitting area is transparent.

9. The 3D image capture device of claim 1, wherein the image processor generates a depth image, of which each pixel value is represented by the level of the depth, by reference to information indicating the distance between the subject and the background.

10. The 3D image capture device of claim 1, wherein the image processor generates a color image based on the photoelectrically converted signal supplied from the image sensor.

11. A light transmitting section to be used by the 3D image capture device of claim 1.

12. A processor to be used by the 3D image capture device of claim 1, the processor comprising the image processor of claim 1.

13. A computer program, stored on a non-transitory computer-readable medium, to be executed by a computer mounted in the 3D image capture device of claim 1, the computer program causing the computer to execute the steps of:
identifying a subject in a received image;
identifying an edge of the subject;
identifying an edge of the subject, wherein the edge lies along the first direction identifying a background in the vicinity of the edge and separate from the subject;
determining a magnitude of variation in the first direction of a lightness or hue of the background, wherein the determined magnitude of variation corresponds to a number of levels having a different intensity or a number of different colors of the background, respectively;

estimating a distance between the subject and the background based on the determined magnitude of variation and a predetermined correlation between the magnitude of variation and distance, wherein a larger determined magnitude of variation corresponds to a larger estimated distance.

\* \* \* \* \*